United States Patent [19]

Wang

[11] Patent Number: 5,084,844

[45] Date of Patent: Jan. 28, 1992

[54] EFFICIENT METHOD FOR STORING SEISMIC TRACES ON DISK

[75] Inventor: Shein S. Wang, Ponca City, Okla.

[73] Assignee: Conoco Inc., Ponca City, Okla.

[21] Appl. No.: 643,386

[22] Filed: Jan. 17, 1991

[51] Int. Cl.$^5$ .............................................. G01V 1/24
[52] U.S. Cl. ....................................... 367/59; 367/63; 364/421
[58] Field of Search ...................... 367/59, 14, 60, 63, 367/21, 37; 364/421

[56] References Cited

U.S. PATENT DOCUMENTS

| | | | |
|---|---|---|---|
| 3,860,759 | 1/1975 | Miller et al. | 367/14 |
| 4,121,191 | 10/1978 | Corkhill | 367/74 |
| 4,509,150 | 4/1985 | Davis | 367/76 |
| 4,543,648 | 9/1985 | Hsu | 367/29 |
| 4,715,002 | 12/1987 | Vernon et al. | 364/422 |

OTHER PUBLICATIONS

Wood, L. C., "Seismic Data Compression Methods", Geophysics, vol. 39, #4, (1974), pp. 499–525.

*Primary Examiner*—Ian J. Lobo

[57] ABSTRACT

A method by which portions of a seismic data set are deleted since no meaningful data is contained in that portion contains the step where a line of data is examined, gather by gather, to determine the smallest useful arrival time for every offset. Data having an arrival time smaller than its useful arrival time is eliminated. In addition, the present method provides a manner of storing traces in pairs. In this method, the total number of traces is mathematically folded in half, storing the last trace with the first trace, etc. In an alternate embodiment, disk saving can be achieved by storing all the traces end to end in a single record and keeping track of the starting point and the length of each trace. The proposed method works for either SHOT or CDP gathers. Each line of data is examined, gather by gather, and the smallest useful arrival time is recorded for every offset.

9 Claims, 4 Drawing Sheets

EFFICIENT METHOD FOR STORING SEISMIC TRACES ON DISK

BACKGROUND OF THE INVENTION

1. Field of the Invention

The present invention pertains to methods for efficient data storage and more particularly to methods for reducing the amount of storage space needed by compressing the data to be stored.

2. Related Prior Art

In general, prior art makes use of the entire data set and compresses the data according to various individual methods. This compression normally takes the form of sequentially deleting samples in a predetermined manner.

U.S. Pat. No. 4,121,191, "Seismic Data Tape Recording System," (Corkhill), relates to an apparatus for increasing the seismic data storage capacity of magnetic tape. A pair of storage registers store a sequential pair of digitized seismic data samples. A subtractor coupled to these two registers provides an output equal to the difference between the two stored samples. A decoder and a set of gates couples the difference word serially to a bit comparator starting with the most significant bit. The first logical "1" which is encountered and all the lower order bits of the same word are serially coupled to and written in a read/write memory. The decoder and gates cause a "0" to be written in a second read/write memory at the beginning of each data word, and "1's" to be written in addresses corresponding to the data written in the first read/write memory. The data in the read/write memories are addressed for reading by a read/address counter, which is incremented by an incremental shaft encoder on a drive motor of a tape recorder. An up-down counter continuously monitors the difference between the number of bits written into the read/write memories and the number read from the memories and serially recorded by the tape recorder. The output of the up-down counter is used to control tape recorder motor speed. This patent relates to a data compression scheme in which a pair of storage registers store a sequential pair of digitized seismic data samples. A circuit coupled to the two registers provides an output equal to the difference between the two storage samples. A decoder and a set of gates are used to couple the difference word serially to a bit comparator starting with the most significant bit. In this reference, sequential pairs of data are stored, not mathematically folded data.

U.S. Pat. No. 4,509,150, "Linear Prediction Coding for Compressing of Seismic Data," (Davis) relates to a seismic data compression technique which comprises sampling each individual seismic trace, operating upon a set number of samples to generate a predicted sample and quantizing the difference between the next sample and the predicted value of the sample, and transmitting the quantum number whereby the amount of information which need be transmitted is limited. In a preferred embodiment, a linear prediction differential pulse code modulation scheme is used to provide the predicted value, while an adaptive quantization scheme is used to quantize the error value to be transmitted, thus yielding further improvements in accuracy. A feedback loop can be applied to the decompression operation to limit quantization noise and further improve the fidelity of representation of the decompressed signals. This patent relates to a data compression scheme which compresses data based on a sample taken of each individual seismic trace. A predetermined number of samples are used to predict a subsequent sample. The difference between the next sample and the predicted value of the sample is quantized. A linear prediction differential pulse code modulation scheme is used to provide the predicted value. An error value is also determined and transmitted. This scheme is closely related to adaptive predictive linear coding. It does not contain teachings or suggestion of folding the data nor the total elimination of a preselected section of data.

U.S. Pat. No. 4,543,648, "Shot to Shot Processing for Measuring a Characteristic of Earth Formations From Inside A Borehole," (Hsu). A method and apparatus for measuring an earth formation characteristic from inside a borehole penetrating earth formations is described. A tool carrying a sonic transmitter and an array of receivers is moved along the borehole and waveform signals from the receiver array are generated from repetitive operations of the transmitter. Sub-arrays of particularly related waveform signals relevant to a selected depth interval that is less in length than the aperture of the array are identified. Each sub-array of signals is then converted to a domain of signals composed of values of a coherence as a function of a range of values of a characteristic such as slowness. The converted signals are then combined so as to provide combined coherence values as a function of different values of the characteristic. One or several peaks of the combined coherence values are detected and determine the value of the characteristic for the selected depth interval. Similar processing is continued for other depth intervals. Independent measurements of the characteristic can be made with both receiver section and transmitter section processing and a borehole compensation technique is described. A fast processing technique for processing data of many sub-array waveforms is described. This patent relates to a method and apparatus for measuring earth formations. The relevance of this patent is found in its discussion of combining converted signals to provide combined coherence values as a function of different values of the characteristic. In this method, one or several peaks of the combined coherence values are detected to determine the value of the characteristic for preselected depth intervals. This reference contains no suggestion or teaching of the folding of data.

U.S. Pat. No. 4,715,002, "System for Recording a Variable Value, Notably in a Well, and For Compressing Stored Measurement Interval Data", (Vernon et al.) relates to a method for acquiring and recording the variation of a value such as a pressure as a function of a parameter such as time in a sonde lowered into a well. Pressure measurements are made at equal time intervals, these measurements are digitized and entered in a nonvolatile memory selectively so as to maximize the accuracy of the pressure variation reading during the measurement period, while minimizing the memory volume necessary for this purpose. The selection of the acquired measurements for their recording comprises a data compression stage in which are eliminated the measurements which do not correspond to a variation in the slope of the pressure-versus-time curve greater than a predetermined threshold. The data compression is effected in a buffer memory in which a deviation index is associated with each measurement. The deviation index is indicative of the time interval separating this measurement from the following one in the buffer memory. This time interval amounts to a number of elementary time intervals which is always a power of two. The exponent of this power is stored as the deviation index. This patent relates to a data compression method in which measurements that do not correspond to a variation in the slope of a pressure versus time curve greater than a predetermined threshold are eliminated. While this reference discusses the elimination of data, it must review a predetermined aspect of each piece of data.

SUMMARY OF THE INVENTION

As stated previously, prior art makes use of or must review the entire data set that is received and, in general, compresses the data according to one of the foregoing methods. The subject of the present invention is distinguished from prior art in two ways. First, it includes a preliminary step for reducing the amount of data to be compressed. Second, it approaches the compression of data differently (mathematically folded) than the methods of the discovered references.

The present invention provides a method by which portions of a seismic data set are deleted since no meaningful data is contained in that portion. A line of data is examined, gather by gather, to determine the smallest useful arrival time for every offset. Data having an arrival time smaller than its useful arrival time is eliminated. In addition, the present application provides a method of storing traces in pairs. In this method, the total number of traces is mathematically folded in half, storing the last trace with the first trace, etc. In an alternate embodiment, disk saving can be achieved by storing all the traces end to end in a single record and keeping track of the starting point and the length of each trace. The proposed method works for either SHOT or CDP gathers. Each line of data is examined, gather by gather, and the smallest useful arrival time is recorded for every offset. For muted data, this can be done by examining how the mute is done. For deep water data or long offset marine data, this can be done by examining the shot at the shallowest water bottom. A straight line is drawn across the gather, so that above this line a determination that no useful data exists is made.

DESCRIPTION OF THE PREFERRED EMBODIMENT

At present, the seismic data are saved on disk as individual traces, each has m words of header information and n words of data. The m+n words are then compressed two to one when writing to disk.

However, additional savings can be achieved by using the following method of the present invention.

The method of the present invention is applicable to either SHOT or CDP gathers. In the following description of the preferred embodiment, the word "gather" is understood to mean both type of gathers.

Figure 1:
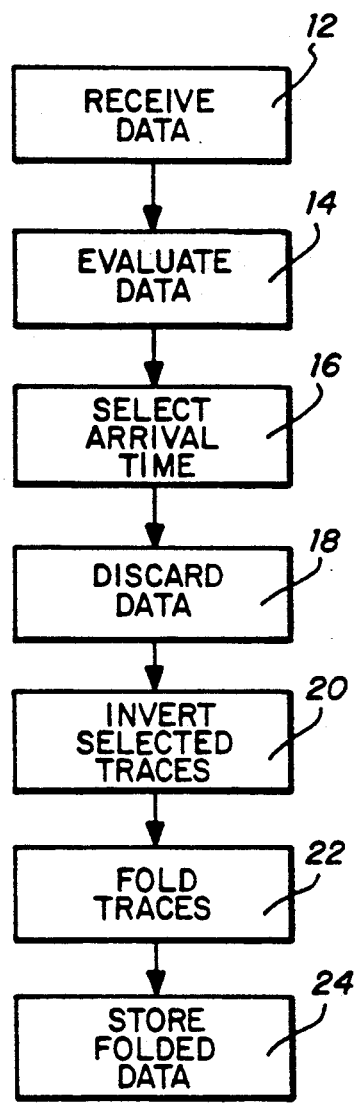
FIG. 1 is a block diagram of a flow chart of the method of the present invention.

Referring now to FIG. 1, data is received at block 12. At block 14, each line of data is examined, gather by gather, and at block 16 the smallest useful arrival time is recorded for every offset. For muted data, this can be done by examining how the mute is done. For deep water data or long offset marine data, this can be done by examining the shot at the shallowest water bottom.

Figure 2:
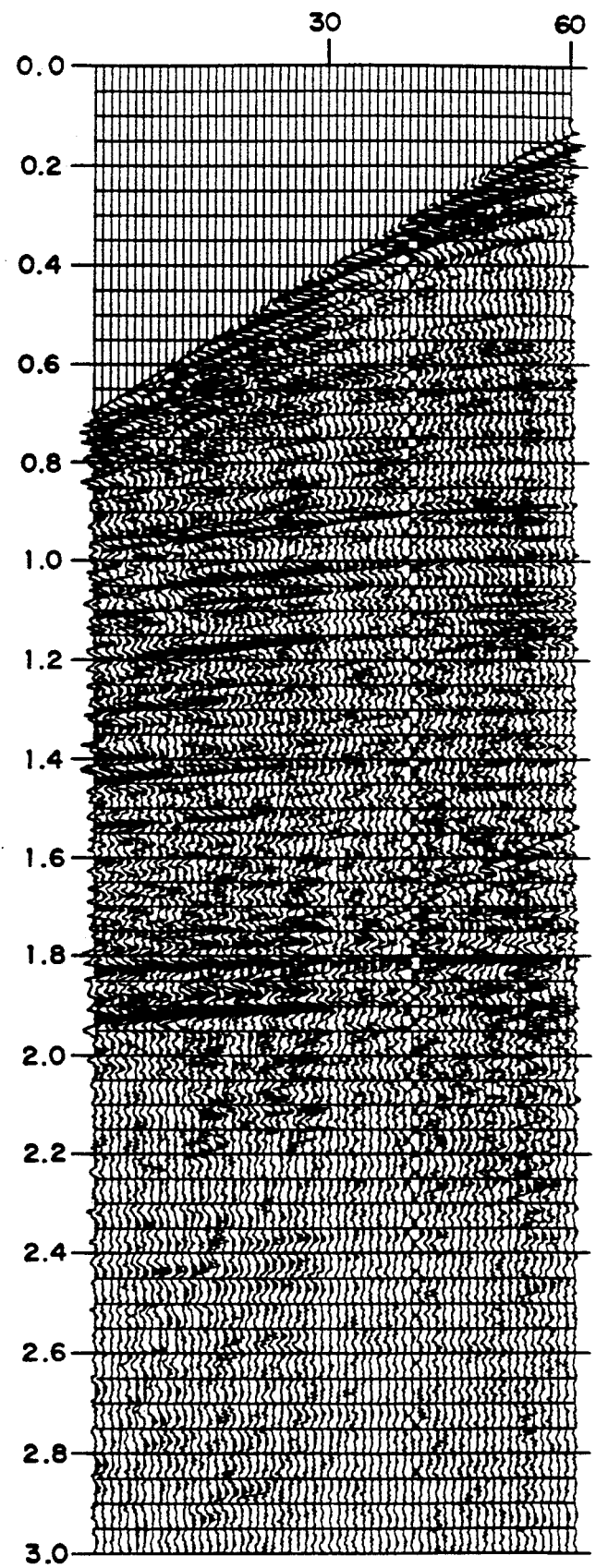
FIG. 2 is a seismogram of exploration data where the data is muted.
Figure 3:
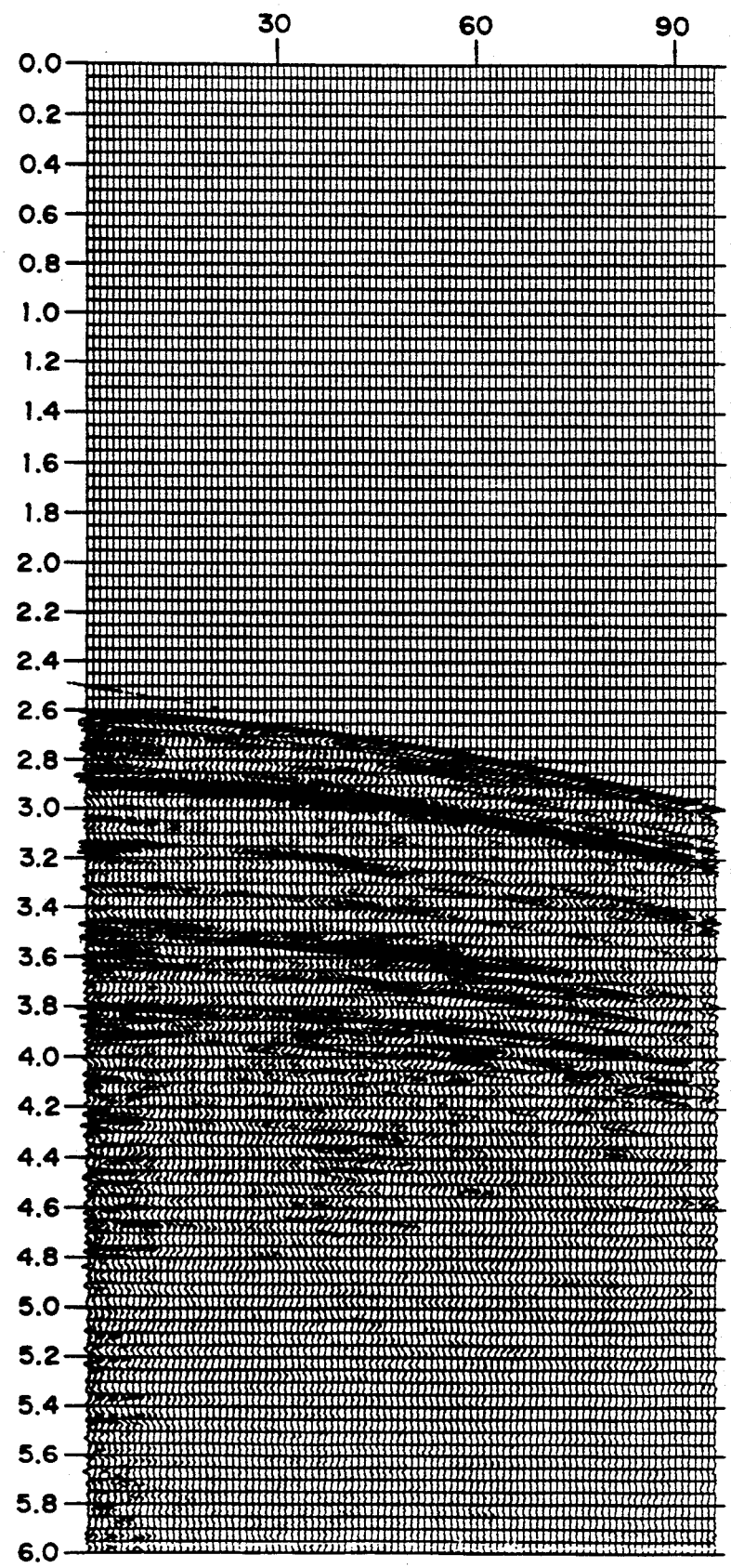
FIG. 3 is a seismogram of exploration data where the data is an example of deep water data.
Figure 4:
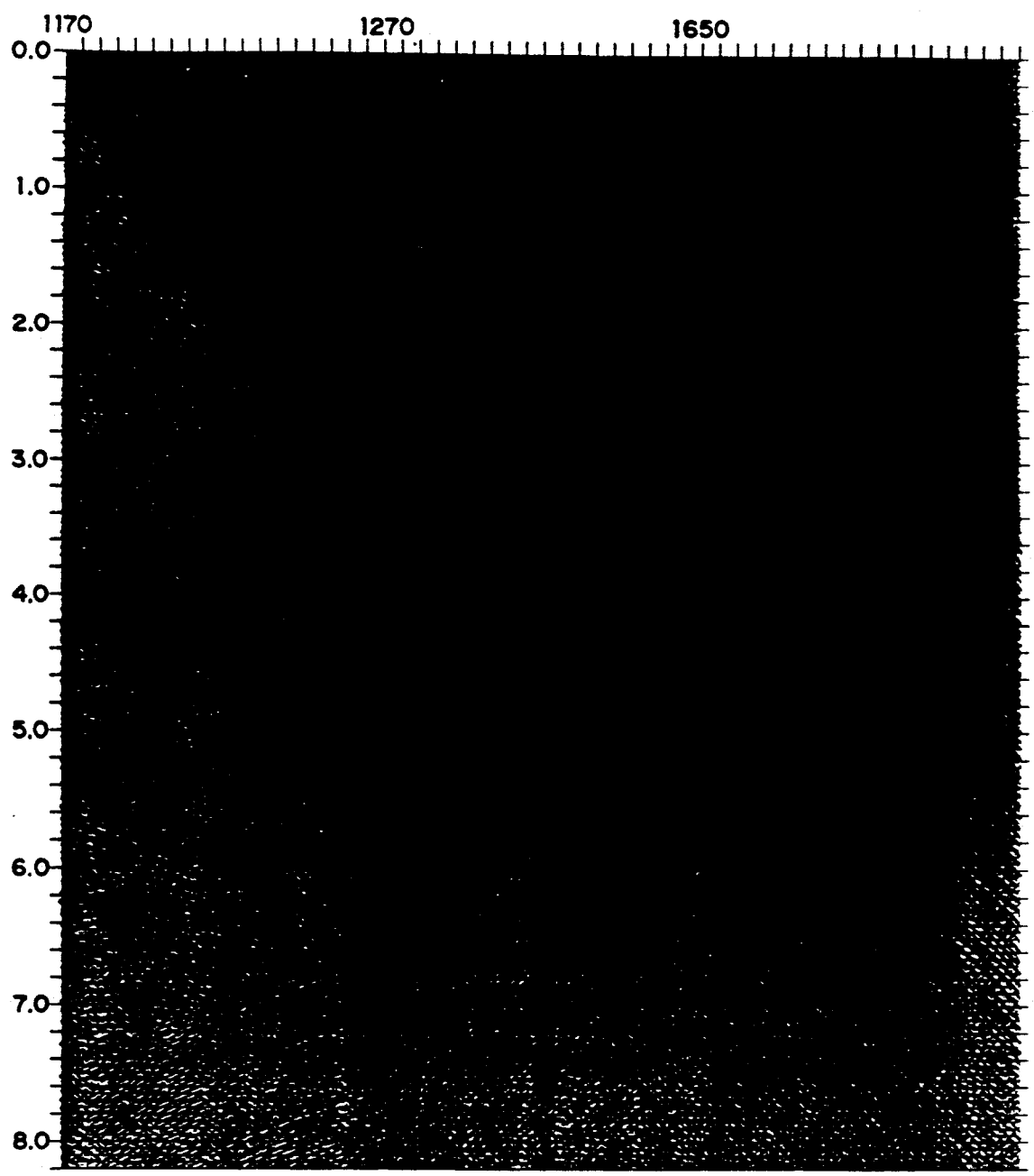
FIG. 4 is a seismogram of exploration data where the data is an example of long offset marine data.

At block 18 a portion of the data which carries no useful data is discarded. Looking closely at the data, a portion of the data is not carrying any useful information. This is because seismic data is frequently muted according to offset to eliminate refraction and direct arrivals. In current seismic processing only the recorded reflecting events are useful for generating the subsurface image. Other events, such as direct arrivals and refractions are not useful in this method and are taken as 'noise'. The first useful event is then the reflection from the shallowest reflector. The corresponding traveltime (t) is equal to the distance from the source to the first reflector to the receiver divided by the sound velocity of the rock layer. This traveltime (t) is referred to as t1. As the distance between the source and receiver (the offset) increases, t1 also increases. For a given offset, the trace contains no useful information from $t=0$ to $t=t1$, therefore, these values are frequently zeroed out or muted. FIGS. 2, 3 and 4 give examples of regions that have been muted out. In FIG. 2, the trace with the larger offset is to the left, whereas in FIG. 3 and FIG. 4, the trace with the larger offset is to the right. The first value beyond the muted zone, or the first value of each offset that is retained, corresponds to the 'useful arrival time' for this offset. For a given gather, every offset will have a different 'useful arrival time'.

To retain the useful portion for all the offsets in all the gathers, the 'useless' portion that is common to all the gathers is discarded. This is done by comparing all the traces having a given offset from all gathers and selecting the smallest useful arrival time from these traces. This is the predetermined arrival time for each particular offset. A set of predetermined arrival times is obtained by doing this for all offsets one by one. Furthermore, for marine data, useful information starts from the water-bottom reflection. For deep water data, this means saving a lot of disk space if we can find ways to store only the useful part of each trace.

FIG. 2 gives an example of muted data. FIG. 3 gives an example of deep water data. FIG. 4 gives an example of long offset marine data. The first part of each trace contains all zeroes, which can be dropped. By trimming every trace to the same length (0.15 to 3 sec for example 1, 0.2 to 8.2 sec for example 3), the following saving can be achieved:

| Example 1: | .15/3.0 = 5% |
| Example 2: | 2.55/6.0 = 42.5% |
| Example 3: | .20/8.2 = 2.4% |

A straight line is drawn across the gather, so that above this line we have no useful data. In FIGS. 2 to 4, this line is marked.

At block 20 the last half of the data is inverted, beginning with the last trace. At block 22 the inverted last trace is stored with the first trace. At block 24 the combined data is stored.

Figure 5:
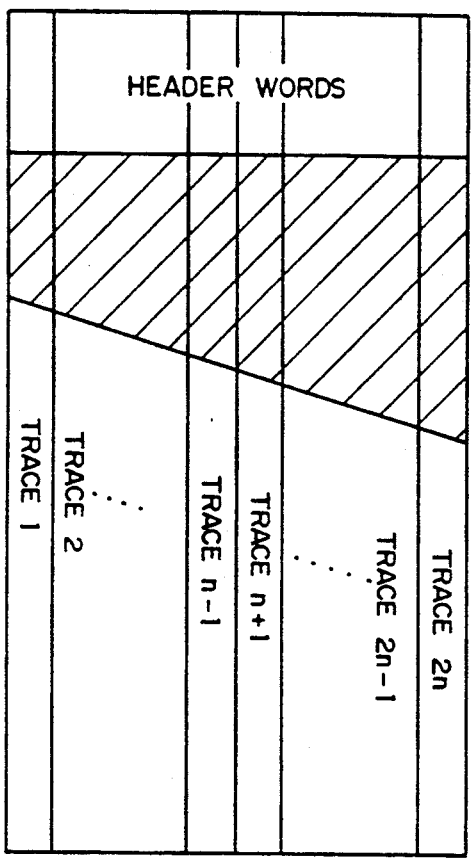
FIG. 5 is a pictorial representation of sequential traces in obtained seismic data.
Figure 6:
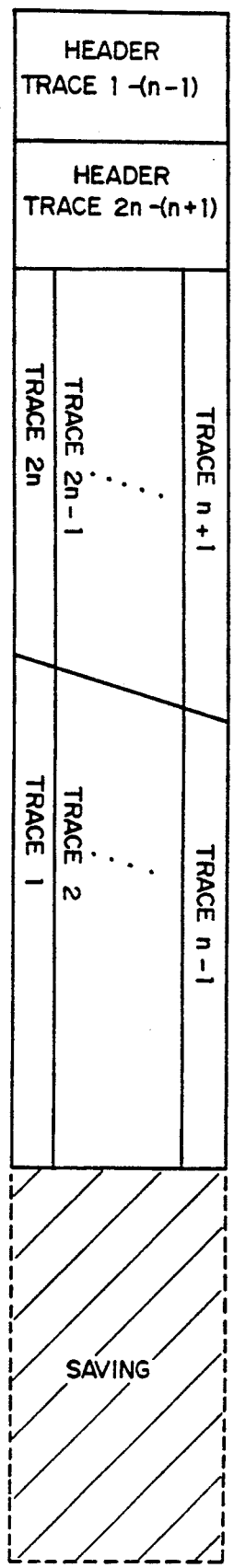
FIG. 6 is a pictorial representation of the process of the present invention where the data is mathematically folded.

FIGS. 5 and 6 demonstrates how the useful data is compressed. Let 2n be the total number of traces (an even number) in the gather. Then trace 2n is turned upside down and stored together with trace 1. Similarly, trace 2n−1 is stored together with trace 2. This method of storing traces in pairs has the advantage that the compressed data contains new traces of the same length. When the data is retrieved from disk for processing, we retrieve one gather at a time and decompress the data by reversing the above procedure. This saving of disk space is obtained at very little cost since the compressing and decompressing can be done using very little computer time. The header words of both traces, of course, need to be stored.

The same saving can be achieved by storing all traces end to end in a single record, keeping track of the starting point and the length of each individual trace. All the header words, as before, need to be kept.

For the three examples, the disk space savings are listed in the following table:

| Example | 1 | 2 | 3 |
| --- | --- | --- | --- |
| Useful data: | | | |
| near trace | .10–3.0 | 2.50–6.0 | .2–8.2 sec |
| far trace | .70–3.0 | 2.90–6.0 | 3.5–8.2 sec |
| Length of new trace | 5.20 | 6.60 | 12.7 |
| Length of 2 old traces | 6.00 | 12.00 | 16.4 |
| Saving (%) | 12.5% | 45% | 22.5% |
| Saving by trimming all traces to same length: | 3.3% | 42.5% | 2.4% |
| Difference | 9.2% | 2.5% | 20.1% |

Thus, as illustrated above, the present invention can reduce the amount of storage space required by nearly one half. By discarding worthless data, significant savings are achieved, not only in storage space, but also in processing time since the worthless data need not be retrieved and reviewed. Valuable data merely needs to be unfolded and put in perspective. The method of the present invention has the distinct advantage of including the data similar to the way it was recorded, without the removal of any portion and the need for reconstruction of the data when it is being used. The reconstruction requires additional computer processing time, which can be very expensive.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

What is claimed is:

1. A method for compressing seismic data comprising the steps of:
   receiving seismic data in the form of data gathers;
   evaluating traces of said seismic data gather by gather retaining all reflective traveltimes thereby determining a useful arrival time for each trace in each gather;
   selecting a smallest useful arrival time from said useful arrival time for each trace of each of said gathers;
   discarding each trace of said seismic gather having an arrival time smaller than said smallest useful arrival time;
   inverting a last trace of a gather;
   combining said inverted last trace with a first trace having an arrival time greater than said smallest useful arrival time; and
   storing said combined inverted last trace and said first trace as compressed data.

2. The method according to claim 1 also including the steps of:
   inverting a second to last trace of a gather;
   combining said inverted second to last trace with a second trace having an arrival time greater than said smallest useful arrival time; and
   storing said combined inverted second to last trace and said second trace as compressed data.

3. A method for compressing seismic data comprising the steps of:
   receiving seismic data in the form of data gathers;
   inverting a last trace of a gather;
   comparing all traces having a given offset from all gathers and selecting the smallest useful arrival time from theses traces, thereby retaining reflective traveltimes, to obtain a predetermined arrival time for each particular offset;
   combining said inverted last trace with a first trace having predetermined arrival time; and
   storing said combined inverted last trace and said first trace as compressed data.

4. The method according to claim 3 also including the steps of:
   evaluating traces of said seismic data gather by gather retaining all reflective traveltimes thereby determining a useful arrival time for each trace in each gather;
   selecting a smallest useful arrival time from said useful arrival time for each trace of each of said gathers; and
   discarding each trace of said seismic gather having an arrival time smaller than said smallest useful arrival time.

5. The method according to claim 4 wherein said evaluating step includes the step of:
   determining the arrival time of a water bottom reflection.

6. The method according to claim 3 also including the steps of:
   inverting a second to last trace of a gather;
   combining said inverted last trace with a second trace having said predetermined arrival time; and
   storing said combined inverted second to last trace and said second trace as compressed data.

7. An apparatus for compressing seismic data comprising:
   means for receiving seismic data in the form of data gathers;
   means for inverting a last half of traces of a gather;
   means for comparing all traces having a given offset from all gathers and selecting the smallest useful arrival time from theses traces, thereby retaining reflective traveltimes, to obtain a predetermined arrival time for each particular offset;
   means for combining said inverted last half of traces with a first half of traces having said predetermined arrival time; and means for storing said combined inverted last half of traces and said first half of traces as compressed data.

8. The apparatus according to claim 7 also including:

means for evaluating traces of said seismic data gather by gather retaining all reflective traveltimes thereby determining a useful arrival time for each trace in each gather;

means for selecting a smallest useful arrival time from said useful arrival time for each trace of each of said gathers; and means for discarding each trace of said seismic gather having an arrival time smaller than the smallest useful arrival time.

9. The apparatus according to claim 8 wherein said means for evaluating includes:

means for determining the arrival time of a water bottom reflection.

* * * * *